United States Patent
Tsai et al.

(10) Patent No.: US 9,467,941 B2
(45) Date of Patent: Oct. 11, 2016

(54) POWER BASED FAST DORMANCY

(75) Inventors: Shiau-He Tsai, San Diego, CA (US);
Insung Kang, San Diego, CA (US);
Qingxin Chen, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 13/491,386

(22) Filed: Jun. 7, 2012

(65) Prior Publication Data

US 2013/0331069 A1 Dec. 12, 2013

(51) Int. Cl.
| | |
|---|---|
| *H04W 52/00* | (2009.01) |
| *H04W 52/02* | (2009.01) |
| *H04W 52/34* | (2009.01) |
| *H04W 52/36* | (2009.01) |

(52) U.S. Cl.
CPC ....... *H04W 52/0216* (2013.01); *H04W 52/346* (2013.01); *H04W 52/367* (2013.01)

(58) Field of Classification Search
CPC . H04W 52/18; H04W 52/36; H04W 52/146; H04W 52/143
USPC .......... 455/11.1, 13.4, 517, 522, 574, 127.1, 455/127.5, 343.1, 343.5, 13.3
See application file for complete search history.

(56) References Cited

U.S. PATENT DOCUMENTS

| | | | | |
|---|---|---|---|---|
| 8,548,475 B2 * | 10/2013 | Dimpflmaier et al. | ....... | 455/437 |
| 8,744,383 B2 * | 6/2014 | Subrahmanya et al. | ... | 455/127.1 |
| 8,995,938 B2 * | 3/2015 | Ali et al. | ................... | 455/127.1 |
| 2005/0113103 A1 * | 5/2005 | Snowden et al. | ............. | 455/451 |
| 2006/0094478 A1 * | 5/2006 | Kim | ................. | H04W 52/0235 455/574 |
| 2007/0111681 A1 | 5/2007 | Alberth et al. | | |
| 2007/0135866 A1 * | 6/2007 | Baker | .................. | A61B 5/0002 607/60 |
| 2008/0146244 A1 * | 6/2008 | Inoue | .................... | H04W 88/10 455/452.2 |
| 2008/0254796 A1 * | 10/2008 | Kim | ...................... | H04W 36/14 455/436 |
| 2011/0158117 A1 | 6/2011 | Ho et al. | | |
| 2011/0222451 A1 | 9/2011 | Peisa et al. | | |
| 2011/0222469 A1 * | 9/2011 | Ali et al. | ....................... | 370/328 |
| 2011/0317556 A1 * | 12/2011 | Hiehata | ................... | H04L 47/11 370/230.1 |
| 2012/0021800 A1 * | 1/2012 | Wilson et al. | ............. | 455/550.1 |
| 2012/0034910 A1 * | 2/2012 | Fang | .................... | H04W 28/16 455/422.1 |

(Continued)

FOREIGN PATENT DOCUMENTS

WO 2011002789 A1 1/2011

OTHER PUBLICATIONS

International Search Report and Written Opinion—PCT/US2013/043795—ISA/EPO—Jul. 11, 2013.

(Continued)

*Primary Examiner* — Cong Tran
(74) *Attorney, Agent, or Firm* — Kristine U. Ekwueme

(57) ABSTRACT

When a user equipment (UE) is communicating wirelessly over a wireless communication network and terminates wireless communication temporarily due to power limit constraints (such as to satisfy a specific absorption rate (SAR) threshold), the UE may maintain its radio access network (RAN) identification (ID) and domain context, in order to quickly resume wireless communication, and avoid upper layer connection setup, once the UE is no longer power limited.

20 Claims, 6 Drawing Sheets

(56) References Cited

U.S. PATENT DOCUMENTS

| | | | |
|---|---|---|---|
| 2012/0071195 A1* | 3/2012 | Chakraborty | H04B 1/3838 455/522 |
| 2012/0172079 A1* | 7/2012 | Baldemair et al. | 455/522 |
| 2012/0178494 A1* | 7/2012 | Haim | H04W 52/365 455/522 |
| 2012/0270592 A1* | 10/2012 | Ngai et al. | 455/522 |
| 2013/0007482 A1* | 1/2013 | Rodriguez et al. | 713/320 |
| 2013/0039173 A1* | 2/2013 | Ehsan et al. | 370/229 |
| 2013/0065525 A1* | 3/2013 | Kiukkonen | H04W 52/36 455/41.2 |
| 2013/0121203 A1* | 5/2013 | Jung | H04W 52/30 370/252 |

OTHER PUBLICATIONS

Taiwan Search Report—TW102119621—TIPO—Dec. 25, 2014.

\* cited by examiner

POWER BASED FAST DORMANCY

BACKGROUND

1. Field

Aspects of the present disclosure relate generally to wireless communication systems, and more particularly, to power based fast dormancy in a TD-SCDMA network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

Offered is a method of wireless communication. The method includes determining a user equipment (UE) is power limited during wireless communications on a first radio access technology (RAT) while consuming power with another application. The method also includes transmitting a signaling connection release indicator to suspend over the air activity of the first RAT while maintaining upper layer connectivity, in response to determining the UE is power limited.

Offered is an apparatus operable in a wireless communication system. The apparatus includes means for determining a user equipment (UE) is power limited during wireless communications on a first radio access technology (RAT) while consuming power with another application. The apparatus also includes means for transmitting a signaling connection release indicator to suspend over the air activity of the first RAT while maintaining upper layer connectivity, in response to determining the UE is power limited.

Offered is a computer program product configured for wireless communication. The computer program product includes a computer-readable medium having non-transitory program code recorded thereon. The program code includes program code to determine a user equipment (UE) is power limited during wireless communications on a first radio access technology (RAT) while consuming power with another application. The program code also includes program code to transmit a signaling connection release indicator to suspend over the air activity of the first RAT while maintaining upper layer connectivity, in response to determining the UE is power limited.

Offered is an apparatus configured for operation in a wireless communication network. The apparatus includes a memory and a processor(s) coupled to the memory. The processor(s) is configured to determine a user equipment (UE) is power limited during wireless communications on a first radio access technology (RAT) while consuming power with another application. The processor(s) is configured to transmit a signaling connection release indicator to suspend over the air activity of the first RAT while maintaining upper layer connectivity, in response to determining the UE is power limited.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
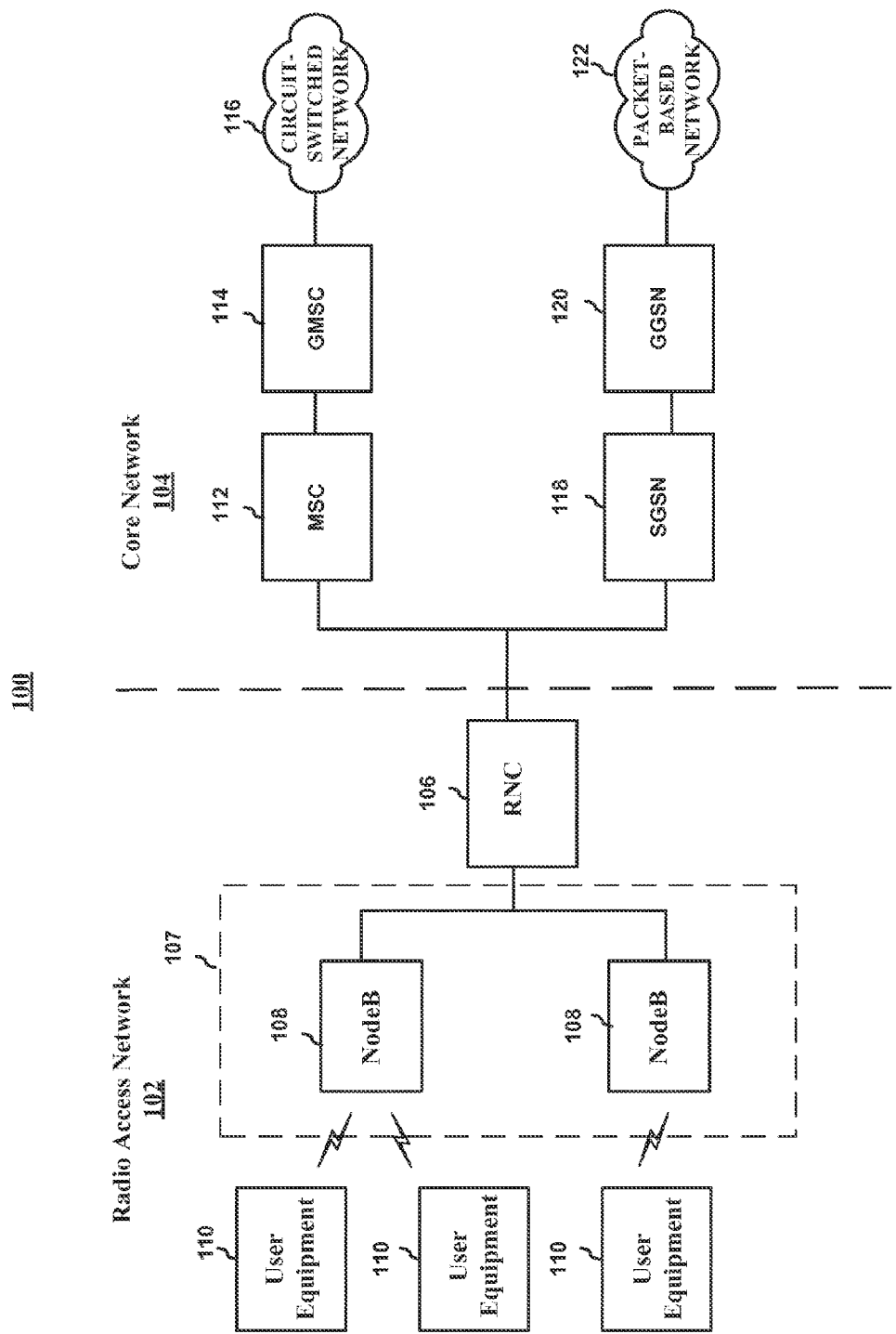
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
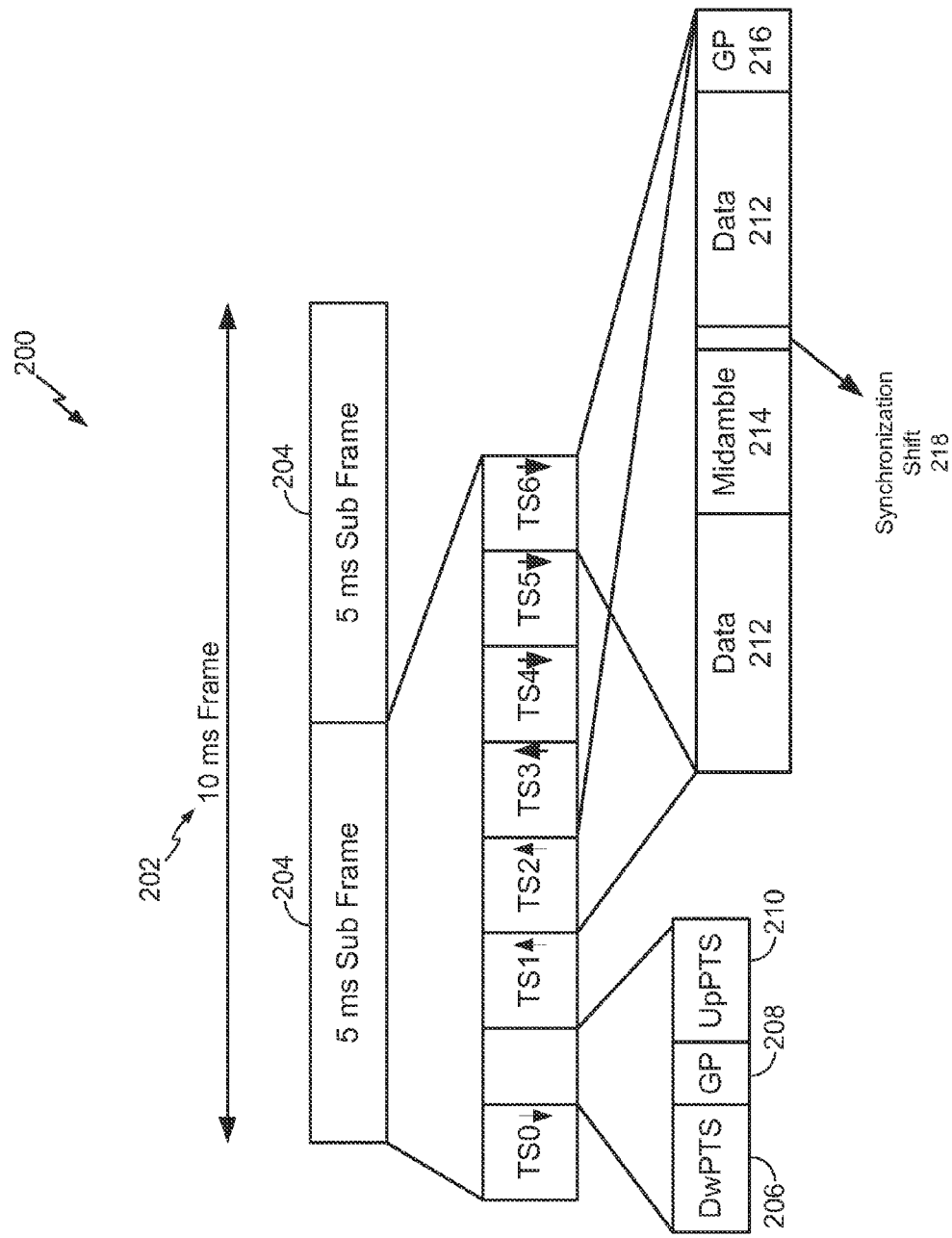
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
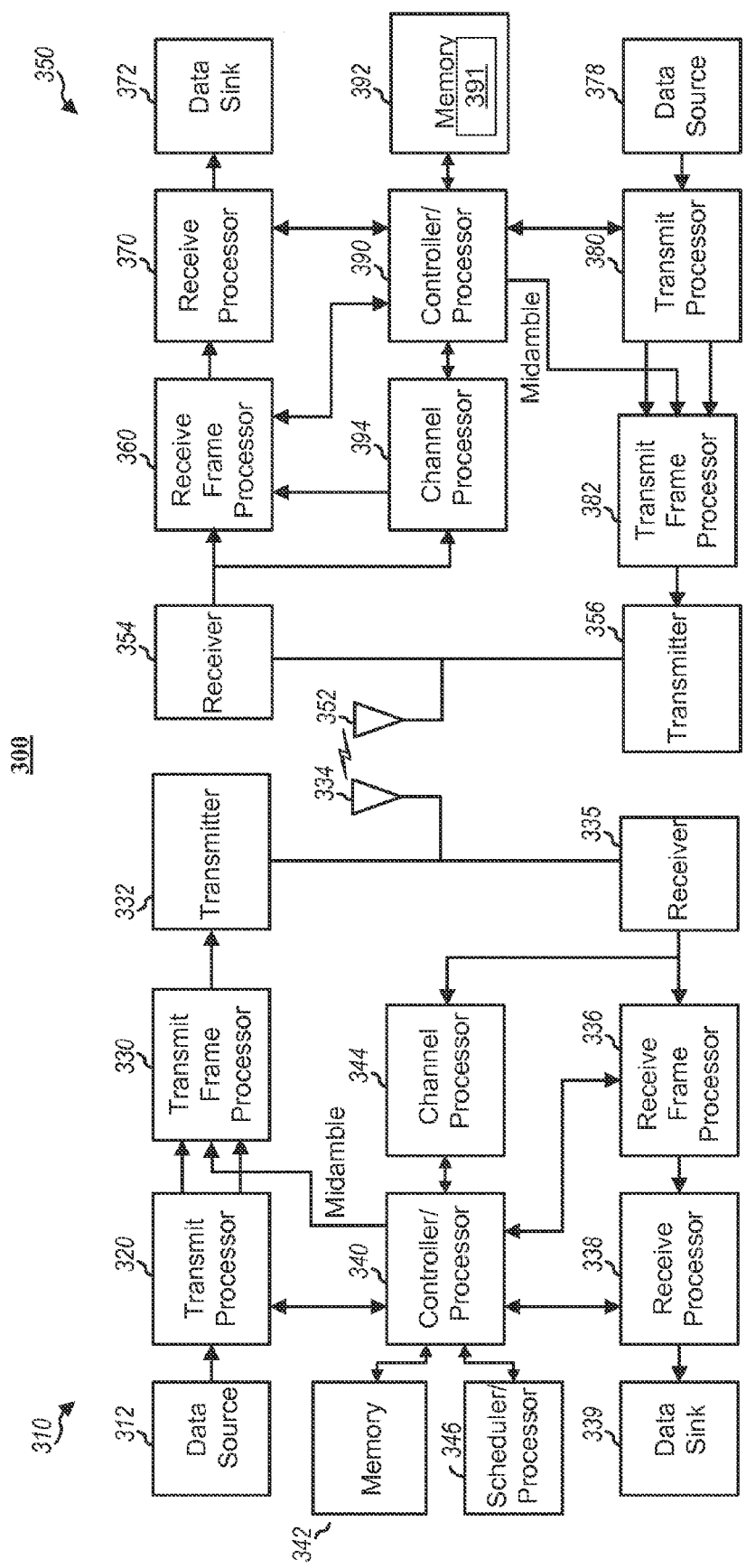
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a fast dormancy module 391 which, when executed by the controller/processor 390, configures the UE 350 for efficient CQI reporting as described below. A scheduler/processor 346 at the node B 310 may be used to allocate resources to the UEs and schedule downlink and/or uplink transmissions for the UEs.

Power-Based Fast Dormancy

If a user equipment (UE) is engaging in wireless communication while simultaneously operating another application (such as a simultaneous voice and data call, or a call combined with some other application such as video or audio playback, location based services, gaming, etc.) the UE may operate at a power level that approaches or exceeds a power threshold. A power threshold may be mandated by a regulatory agency for user protection, may be set by a device manufacturer, or may be set for another reason. For example, governmental, or other bodies, such as the United States Federal Communication Commission (FCC), may regulate the amount of energy a device can transmit. The FCC regulates the measure of the amount of radio frequency (RF) energy absorbed by the human body when using a mobile device. The amount of absorbed energy is referred to as a specific absorption rate (SAR) value. To ensure safe exposure, the FCC requires cell phone manufacturers to ensure that their phones comply with SAR threshold limits during operation.

In certain situations, a power threshold such as an SAR limit may limit how a user desires to operate a mobile device. For example, when a 2G/3G cellular terminal is acting as a phone near a human ear while simultaneously operating as a WLAN hot spot, the total transmitted power may approach a regulatory specific absorption rate (SAR) threshold.

Exceeding a power threshold, such as an SAR threshold, may cause a call to be dropped. For example, when a dual active UE is simultaneously engaged in a Global System for Mobile Communications (GSM) call for voice and a Time Division Synchronous Code Division Multiple Access (TD-SCDMA) call for data, the UE may exceed the established SAR threshold and enter a power limited state. If this happens, the voice call may be preserved over the data call, causing the TD-SCDMA data transmission to be suspended because of power backoff and loss of the data call's share of power to the GSM voice call. If the data call loses power in this manner, the call may become out-of-synch and lose layer 2 acknowledgment, resulting in a radio link control (RLC) timeout at the node B and a dropped call. In particular, this may happen when the UE is moved toward the body, resulting in a more stringent SAR threshold. When the UE is moved away from the body, and the UE exits the power limited state, the data call may be completely restarted, resulting in excessive setup delay.

The delay in data call re-establishment after a UE recovers from a power limited scenario may be avoided by extending the usage of fast dormancy. Currently, fast dormancy is only based on a network configured packet-switched (PS) data inactivity timer. If a UE has no packet-switched data activity for a period of time, the UE may send the network a signaling connection release indicator, such as a "UE requested data session end" message. Upon receiving the indicator, the network moves the data call to a battery saving state but maintains the call's radio access network identifier and packet-switched domain context. By incorporating power criteria into the trigger of fast dormancy, delays in data call re-establishment may be avoided.

When the combined device power of a device exceeds a threshold, one of the radio technologies (e.g., TD-SCDMA or WiFi supporting the data call) may be suspended. In this case, when power distributed to the radio technology with an active data session drops below a threshold and thus loses power due to voice-centric power, the radio technology with the active data session may trigger the fast dormancy request. The fast dormancy request preserves the radio access network (RAN) temporary identifier (RNTI) and the packet-switched domain context (and potentially other information) to avoid radio resource control (RRC) connection release and data call drop. The domain context may include a packet data protocol (PDP) context, which comprises an Internet-Protocol (IP) address and Quality of Service (QoS) profiles. The domain context may also include security mode information for a packet-switched domain, including integrity check and ciphering parameters.

When the UE comes out of power backoff, and the radio technology for the data call has sufficient power to resume packet-switched activity, the data call only renews the radio bearer, bypassing the entire radio resource control (RRC) connection setup for a much quicker return to communications. Thus, the packet-switched domain function becomes more responsive whenever the UE is moved away from the body, such as when a person starts checking internet information during a phone call, or when a mobile device otherwise leaves a power limited state. That is, the present disclosure improves the user experience for dual mode devices.

Figure 4:
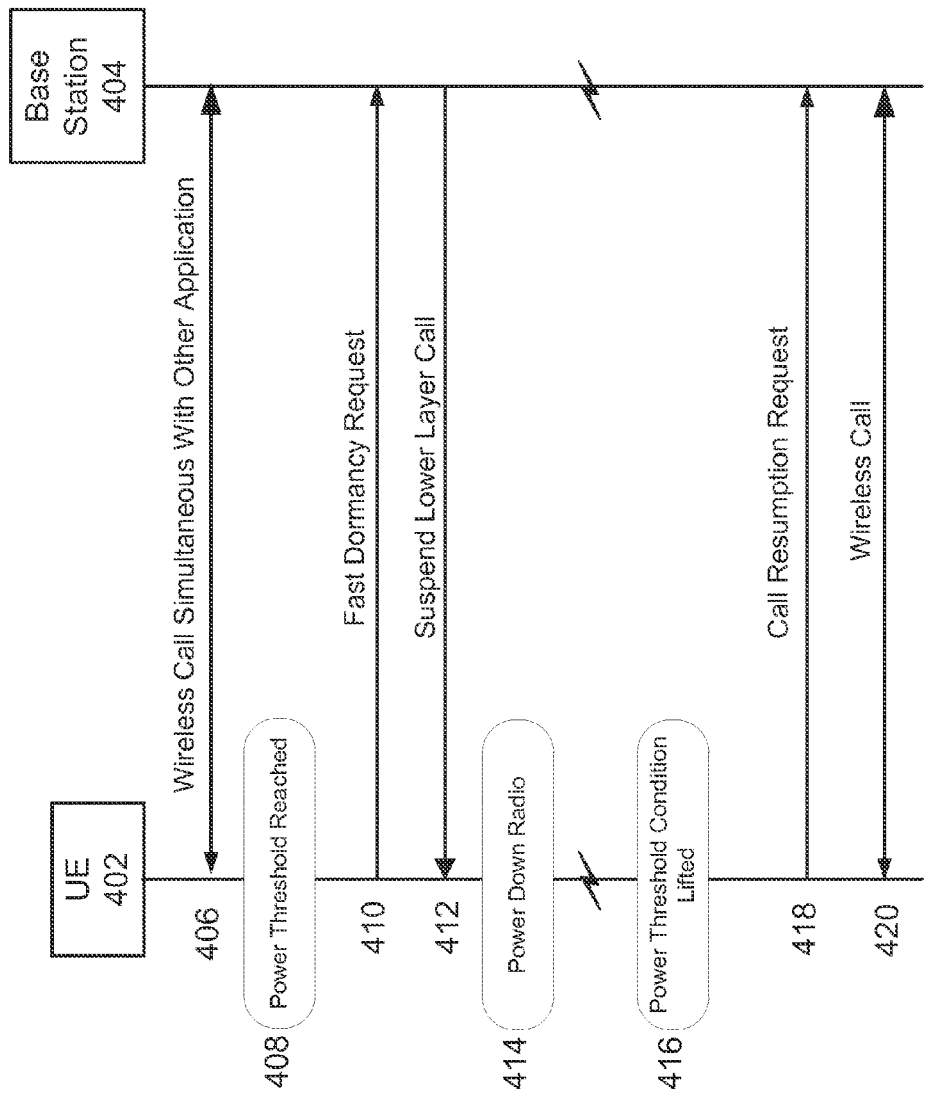
FIG. 4 is a call flow diagram illustrating power based fast dormancy according to one aspect of the present disclosure.

FIG. 4 is a call flow diagram illustrating power based fast dormancy according to one aspect of the present disclosure. At time 406 a UE 402 is engaging in a wireless call with a base station 404. The wireless call occurs simultaneously with another application, for example another wireless call. In one example, the first wireless call is a data call and the other application is a voice call. The base station may be for any of a variety of wireless radio technologies, for example, LTE, TD-SCDMA, etc.

At time 408 the UE reaches a power threshold, such as a SAR threshold, because the combined power for the wireless call and the other application exceeds the allowed power threshold. The power threshold may be reached because the UE 402 is located close to a body of the user.

At time 410, the UE 402 sends a request, such as a fast dormancy request, to the base station 404 to maintain upper level connectivity, while preparing to drop the data call. The data call will be dropped in order to reduce overall device power to comply with the power threshold. At time 412 the base station 404 suspends a lower layer connection while retaining upper layer connectivity with the UE 402. At time 414 the UE 402 powers down the radio to bring the overall UE power below the power threshold.

At time 416, the UE determines that radio operation is again possible without exceeding the power threshold, for example when the UE is moved away from the user's body. At time 418, the UE 402 notifies the base station 404 418 to resume the data call. The base station 404 then resumes the call 420 using the preserved upper layer connectivity. By using the preserved upper layer connectivity, the wireless call is quickly resumed.

Figure 5:
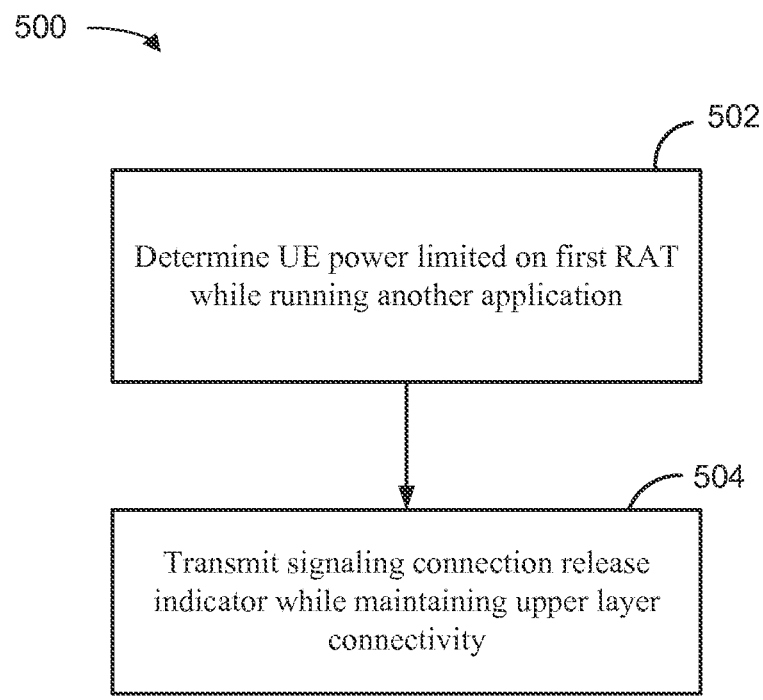
FIG. 5 is a block diagram illustrating a method for power based fast dormancy according to one aspect of the present disclosure.

FIG. 5 shows a wireless communication method 500 according to one aspect of the disclosure. An apparatus determines a user equipment (UE) is power limited during wireless communications on a first radio access technology (RAT) while consuming power with another application, as shown in block 502. The apparatus also transmits a signaling connection release indicator to suspend over the air activity of the first RAT while maintaining upper layer connectivity, in response to determining the UE is power limited, as shown in block 504.

Figure 6:
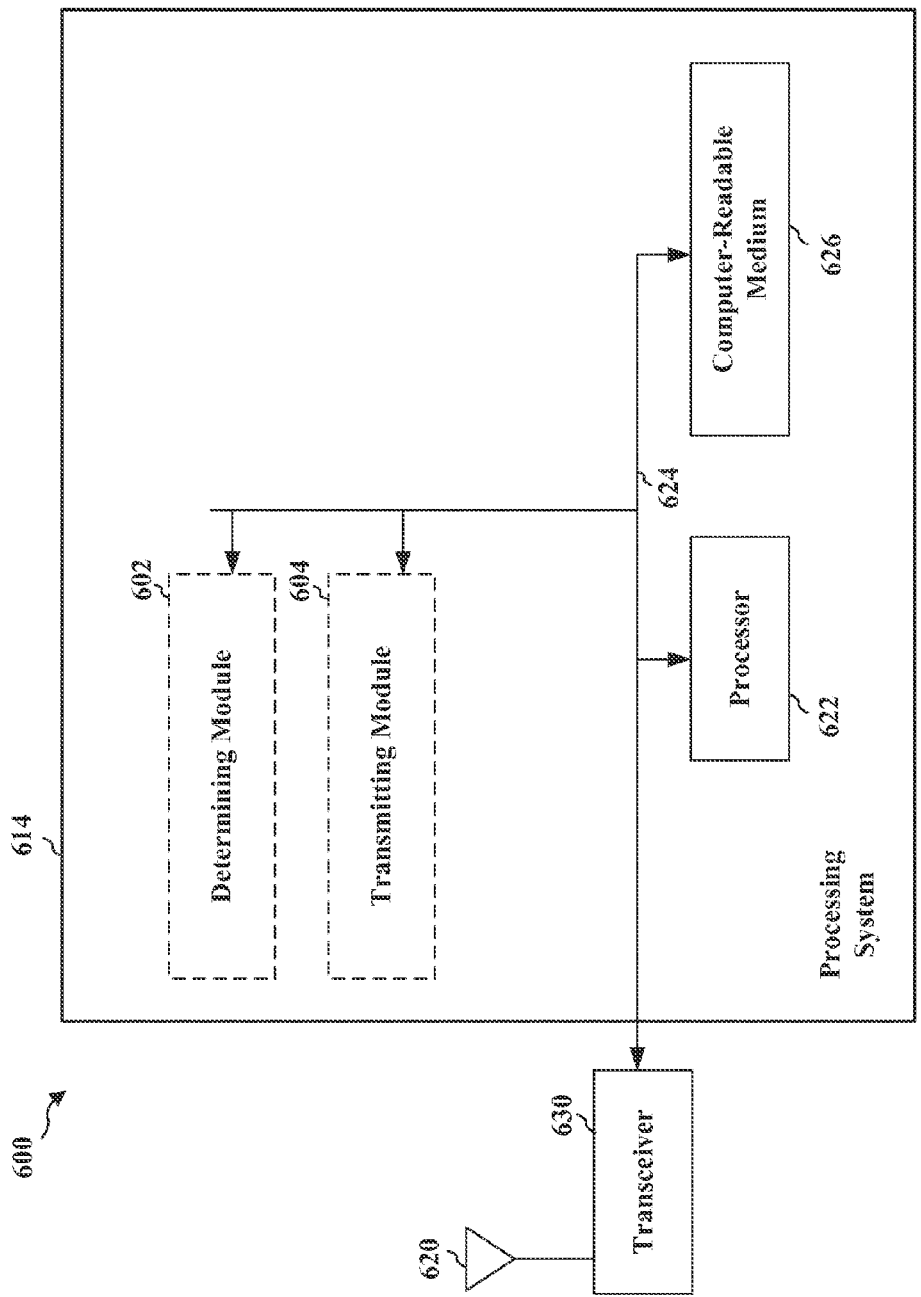
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 622 the modules 602 and 604, and the computer-readable medium 626. The bus 624 may also link various other circuits such as timing sources, peripherals, voltage regulators, and power management circuits, which are well known in the art, and therefore, will not be described any further.

The apparatus includes a processing system 614 coupled to a transceiver 630. The transceiver 630 is coupled to one or more antennas 620. The transceiver 630 enables communicating with various other apparatus over a transmission medium. The processing system 614 includes a processor 622 coupled to a computer-readable medium 626. The processor 622 is responsible for general processing, including the execution of software stored on the computer-readable medium 626. The software, when executed by the processor 622, causes the processing system 614 to perform the various functions described for any particular apparatus. The computer-readable medium 626 may also be used for storing data that is manipulated by the processor 622 when executing software.

The processing system 614 includes a determining module 602 for determining a user equipment (UE) is power limited during wireless communications on a first radio access technology (RAT) while consuming power with another application. The processing system 614 includes a transmitting module 604 for transmitting a signaling connection release indicator to suspend over the air activity of the first RAT while maintaining upper layer connectivity, in response to determining the UE is power limited. The modules may be software modules running in the processor 622, resident/stored in the computer readable medium 626, one or more hardware modules coupled to the processor 622, or some combination thereof. The processing system 614 may be a component of the UE 350 and may include the memory 392, and/or the controller/processor 390.

In one configuration, an apparatus such as a UE is configured for wireless communication including means for determining. In one aspect, the above means may be the controller/processor 390, the memory 392, fast dormancy module 391, processor 622, computer-readable medium 626, determining module 602, and/or the processing system 614 configured to perform the functions recited by the aforementioned means. In another aspect, the aforementioned means may be a module or any apparatus configured to perform the functions recited by the aforementioned means.

In one configuration, an apparatus such as a UE is configured for wireless communication including means for transmitting. In one aspect, the above means may be the antennas 352/620, the receiver 354, the transceiver 630, the transmitter 356, the transmit processor 380, the controller/processor 390, the memory 392, fast dormancy module 391, processor 622, computer-readable medium 626, transmitting module 604 and/or the processing system 614 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining a user equipment (UE) is power limited during wireless communications on a first radio access technology (RAT) while consuming power with another application; and
   transmitting a signaling connection release indicator to suspend over the air activity of the first RAT while maintaining upper layer connectivity, in response to determining the UE is power limited, in which maintaining the upper layer connectivity preserves connectivity for resuming wireless communications of the first RAT.

2. The method of claim 1, in which the UE is power limited due to a specific absorption rate (SAR) threshold.

3. The method of claim 1, further comprising resuming wireless communications on the first RAT when the UE is no longer power limited.

4. The method of claim 3, in which resuming wireless communications occurs without upper layer connection setup.

5. The method of claim 1, in which maintaining upper layer connectivity comprises maintaining a UE radio access network (RAN) identification (ID) and domain context.

6. The method of claim 1, in which the other application comprises wirelessly communicating over a second radio access technology (RAT).

7. The method of claim 6, in which the second RAT supports voice communications, and the first RAT supports data communications.

8. An apparatus operable in a wireless communication system, the apparatus comprising:
   means for determining a user equipment (UE) is power limited during wireless communications on a first radio access technology (RAT) while consuming power with another application; and
   means for transmitting a signaling connection release indicator to suspend over the air activity of the first RAT while maintaining upper layer connectivity, in response to determining the UE is power limited, in which maintaining the upper layer connectivity preserves connectivity for resuming wireless communications of the first RAT.

9. The apparatus of claim 8, in which the UE is power limited due to a specific absorption rate (SAR) threshold.

10. The apparatus of claim 8, in which maintaining upper layer connectivity comprises maintaining a UE radio access network (RAN) identification (ID) and domain context.

11. A computer-readable medium having non-transitory program code for wireless communication recorded thereon, the program code comprising:
    program code to determine a user equipment (UE) is power limited during wireless communications on a first radio access technology (RAT) while consuming power with another application; and
    program code to transmit a signaling connection release indicator to suspend over the air activity of the first RAT while maintaining upper layer connectivity, in response to determining the UE is power limited, in which maintaining the upper layer connectivity preserves connectivity for resuming wireless communications of the first RAT.

12. The computer-readable medium of claim 11, in which the UE is power limited due to a specific absorption rate (SAR) threshold.

13. The computer-readable medium of claim 11, in which maintaining upper layer connectivity comprises maintaining a UE radio access network (RAN) identification (ID) and domain context.

14. An apparatus configured for operation in a wireless communication network, the apparatus comprising:
    a transmitter;
    a memory; and
    at least one processor coupled to the memory and the transmitter, the at least one processor being configured:
    to determine a user equipment (UE) is power limited during wireless communications on a first radio access technology (RAT) while consuming power with another application; and
    to transmit, using the transmitter, a signaling connection release indicator to suspend over the air activity of the first RAT while maintaining upper layer connectivity, in response to determining the UE is power limited, in which maintaining the upper layer connectivity preserves connectivity for resuming wireless communications of the first RAT.

15. The apparatus of claim 14, in which the UE is power limited due to a specific absorption rate (SAR) threshold.

16. The apparatus of claim 14, in which the at least one processor is further configured to resume wireless communications on the first RAT when the UE is no longer power limited.

17. The apparatus of claim 16, in which resuming wireless communications occurs without upper layer connection setup.

18. The apparatus of claim 14, in which maintaining upper layer connectivity comprises maintaining a UE radio access network (RAN) identification (ID) and domain context.

19. The apparatus of claim 14, in which the other application comprises wirelessly communicating over a second radio access technology (RAT).

20. The apparatus of claim 19, in which the second RAT supports voice communications, and the first RAT supports data communications.

* * * * *